(12) United States Patent
Yi et al.

(10) Patent No.: US 7,896,559 B2
(45) Date of Patent: Mar. 1, 2011

(54) CABLE ASSEMBLY HAVING FLOATABLE TERMINATION

(75) Inventors: Chong Yi, Mechanicsburg, PA (US); Kevin E. Walker, Hershey, PA (US); Pei Tsao, La Harbra, CA (US); Stephen Sedio, Valley Center, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/317,653

(22) Filed: Dec. 23, 2008

(65) Prior Publication Data

US 2010/0158448 A1 Jun. 24, 2010

(51) Int. Cl.
  *G02B 6/38* (2006.01)
  *G02B 6/30* (2006.01)
  *H01R 33/00* (2006.01)
(52) U.S. Cl. .............................. 385/75; 385/49; 385/73; 385/88; 385/89; 439/660
(58) Field of Classification Search .................... 385/49, 385/73, 75, 88, 89, 92, 94; 439/660
See application file for complete search history.

(56) References Cited

U.S. PATENT DOCUMENTS

| | | | |
|---|---|---|---|
| 5,833,495 A * | 11/1998 | Ito ......................... | 439/607.48 |
| 6,783,397 B2 * | 8/2004 | Yang Lee .............. | 439/607.45 |
| 6,830,383 B2 * | 12/2004 | Huang ......................... | 385/92 |
| 7,021,971 B2 | 4/2006 | Chou et al. | |
| 7,104,848 B1 | 9/2006 | Chou et al. | |
| 7,380,991 B2 | 6/2008 | Schempp | |
| 7,572,071 B1 * | 8/2009 | Wu .............................. | 385/94 |
| 7,717,733 B1 * | 5/2010 | Yi et al. ...................... | 439/452 |
| 7,798,726 B2 * | 9/2010 | Sabo ........................... | 385/88 |

* cited by examiner

*Primary Examiner*—Daniel Petkovsek
(74) *Attorney, Agent, or Firm*—Wei Te Chung; Andrew C. Cheng; Ming Chieh Chang

(57) ABSTRACT

A cable assembly (100) includes an insulative housing (2) having a base portion (21) and a tongue portion (22) extending forwardly therefrom, at least a mounting cavity (2212) and a curved slot (2213) defined in a low section of the insulated housing, said curved slot located behind and communicated to the mounting cavity; a plurality of contacts (4) supported by the base portion, each contact having a mating portion arranged proximate to the top side of the tongue portion, and a tail portion extending beyond a back surface of the base portion; an optical module (6) accommodated in the mounting cavity and a spring member (63) arranged between the optical module and a back side of the mounting cavity; an optical fiber (53) extending through the curved slot and connected to the optical module; and a metal shell (8) having a mating frame enclosing the tongue portion and the optical module therein.

20 Claims, 7 Drawing Sheets

CABLE ASSEMBLY HAVING FLOATABLE TERMINATION

CROSS-REFERENCE TO RELATED APPLICATIONS

This application is related to U.S. Pat. No. 7,625,243, filed on Jun. 13, 2007 and entitled "EXTENSION TO UNIVERSAL SERIAL BUS CONNECTOR WITH IMPROVED CONTACT ARRANGEMENT", and U.S. Pat. No. 7,422,488, filed on Nov. 2, 2007 and entitled "EXTENSION TO ELECTRICAL CONNECTOR WITH IMPROVED CONTACT ARRANGEMENT AND METHOD OF ASSEMBLING THE SAME", and U.S. Pat. No. 7,534,143, filed on Nov. 16, 2007 and entitled "ELECTRICAL CONNECTOR WITH IMPROVED WIRE TERMINATION", all of which have the same assignee as the present invention.

BACKGROUND OF THE INVENTION

1. Field of the Invention

The present invention relates to a cable assembly, more particularly to a cable assembly with a floatable termination capable of movement with respect to a connector thereof.

2. Description of Related Art

Recently, personal computers (PC) are used of a variety of techniques for providing input and output. Universal Serial Bus (USB) is a serial bus standard to the PC architecture with a focus on computer telephony interface, consumer and productivity applications. The design of USB is standardized by the USB Implementers Forum (USB-IF), an industry standard body incorporating leading companies from the computer and electronic industries. USB can connect peripherals such as mouse devices, keyboards, PDAs, gamepads and joysticks, scanners, digital cameras, printers, external storage, networking components, etc. For many devices such as scanners and digital cameras, USB has become the standard connection method.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed; 3) A Hi-Speed rate of up to 480 Mbit/s (60 MB/s). Though Hi-Speed devices are advertised as "up to 480 Mbit/s", not all USB 2.0 devices are Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transfer rates of the non-USB protocols discussed above are highly desirable for certain applications. However, these non-USB protocols are not used as broadly as USB protocols. Many portable devices are equipped with USB connectors other than these non-USB connectors. One important reason is that these non-USB connectors contain a greater number of signal pins than an existing USB connector and are physically larger as well. For example, while the PCI Express is useful for its higher possible data rates, a 26-pin connectors and wider card-like form factor limit the use of Express Cards. For another example, SATA uses two connectors, one 7-pin connector for signals and another 15-pin connector for power. Due to its clumsiness, SATA is more useful for internal storage expansion than for external peripherals.

The existing USB connectors have a small size but low transmission rate, while other non-USB connectors (PCI Express, SATA, et al) have a high transmission rate but large size. Neither of them is desirable to implement modern high-speed, miniaturized electronic devices and peripherals. To provide a kind of connector with a small size and a high transmission rate for portability and high data transmitting efficiency is much desirable.

In recent years, more and more electronic devices are adopted for optical transmitter. It may be good idea to design a connector which is capable of transmitting an electrical signal and an optical signal. Someone has begun to conceive such kind of connector which is compatible of electrical and optical signals transmitting. The connector includes metallic contacts assembled to an insulated housing and several optical lenses bundled together and mounted to the housing too. A kind of hybrid cable includes wires and optical fibers are respectively attached to the metallic contacts and the optical lenses.

However, the optical lenses are fixed to the insulated housing of the connector and have no floatable function.

BRIEF SUMMARY OF THE INVENTION

Accordingly, an object of the present invention is to provide a cable assembly has floatable termination(s).

In order to achieve the above-mentioned object, a cable assembly in accordance with present invention comprises an insulative housing having a base portion and a tongue portion extending forwardly from the base portion, said tongue portion defining a top side and a bottom side opposite to the top side, at least a mounting cavity and a curved slot defined in a low section of the insulated housing, said curved slot located behind and communicated to the mounting cavity; a plurality of contacts supported by the base portion, each contact having a mating portion arranged proximate to the top side of the tongue portion, and a tail portion extending beyond a back surface of the base portion; an optical module accommodated in the mounting cavity and a spring member arranged between the optical module and a back side of the mounting cavity; an optical fiber extending through the curved slot and connected to the optical module; and a metal shell having a mating frame enclosing the tongue portion and the optical module therein.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
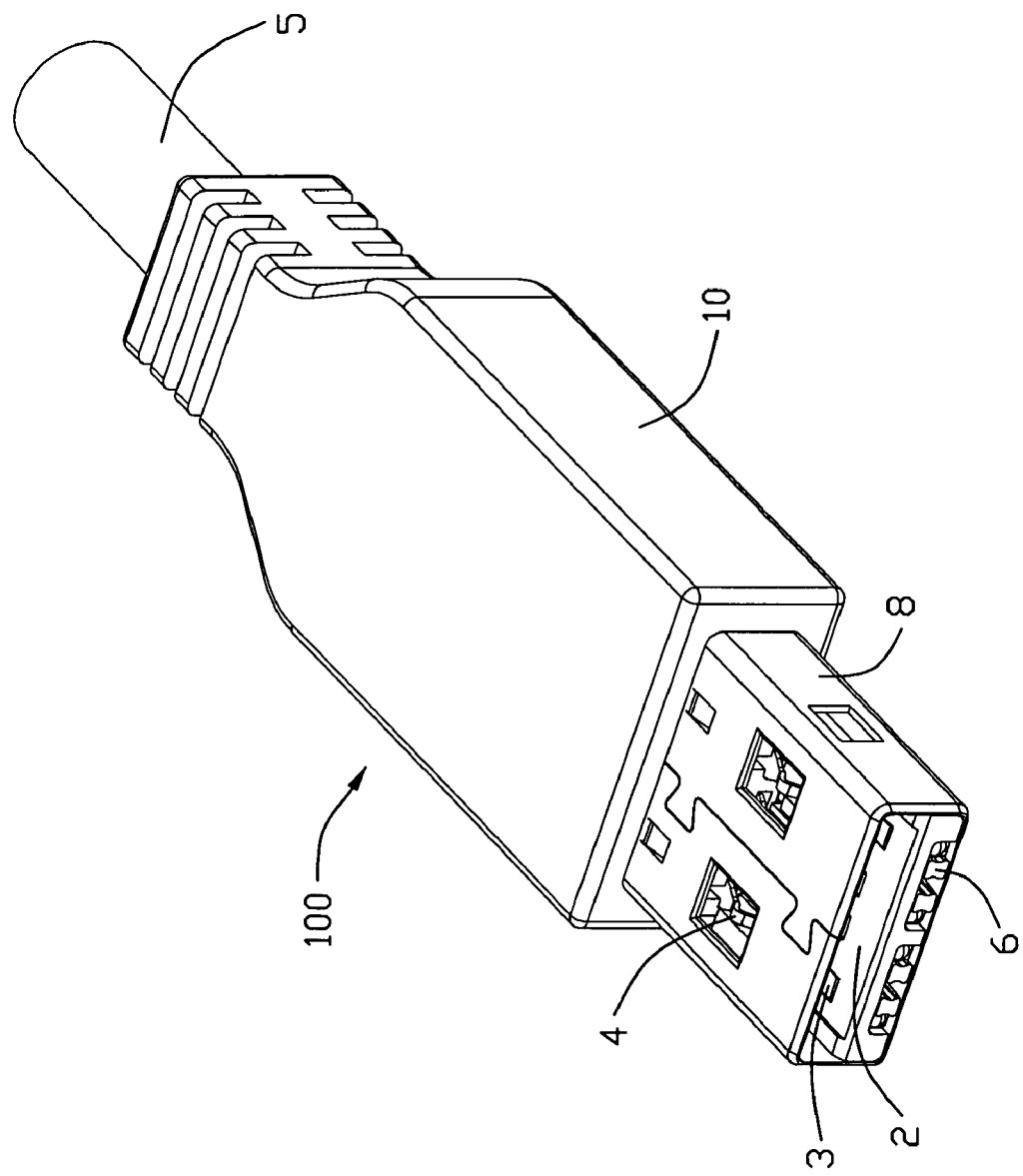
FIG. 1 is an assembled, perspective view of a cable assembly in accordance with the first embodiment of the present invention.
Figure 2:
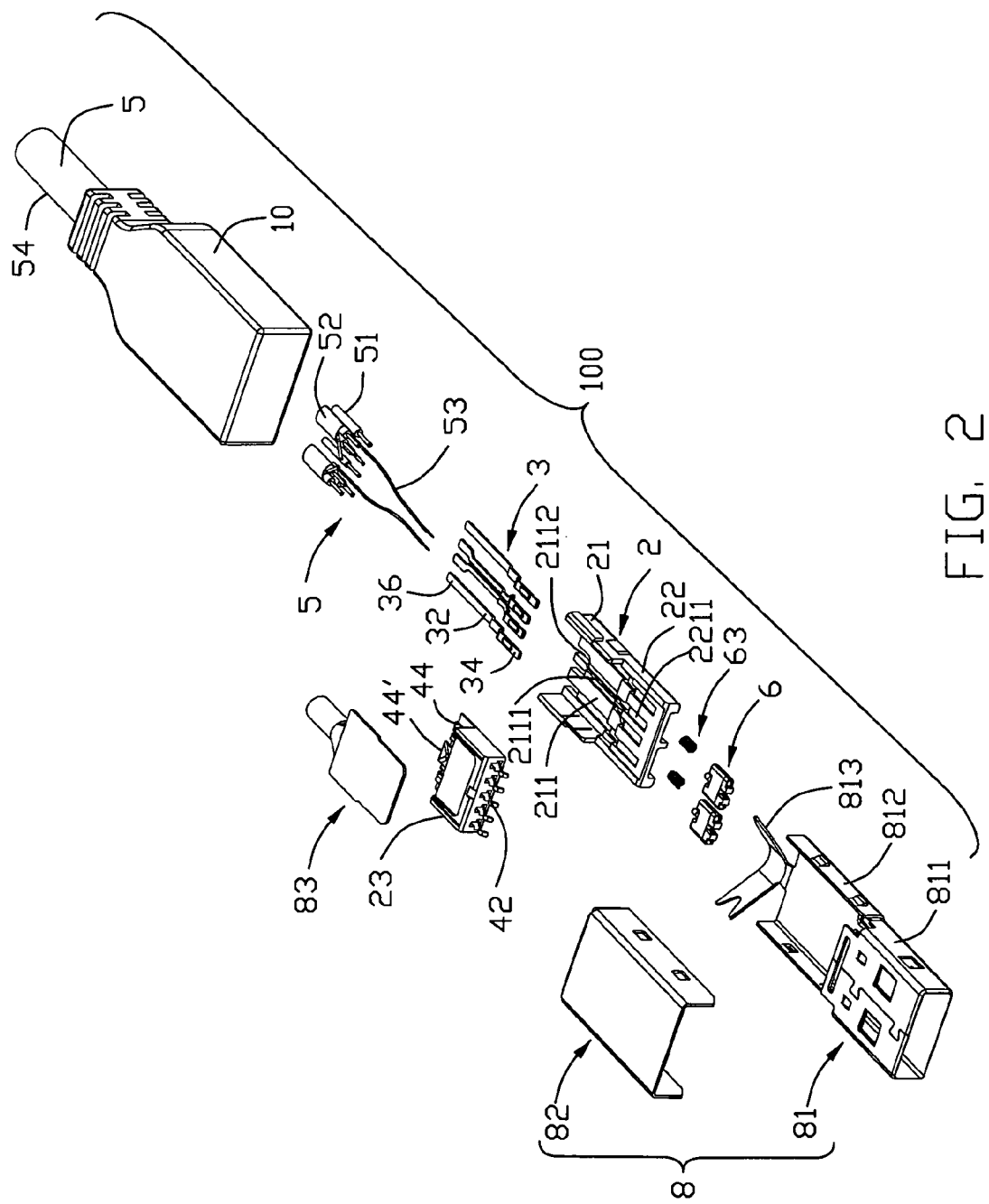
FIG. 2 is an exploded, perspective view of FIG. 1.
Figure 3:
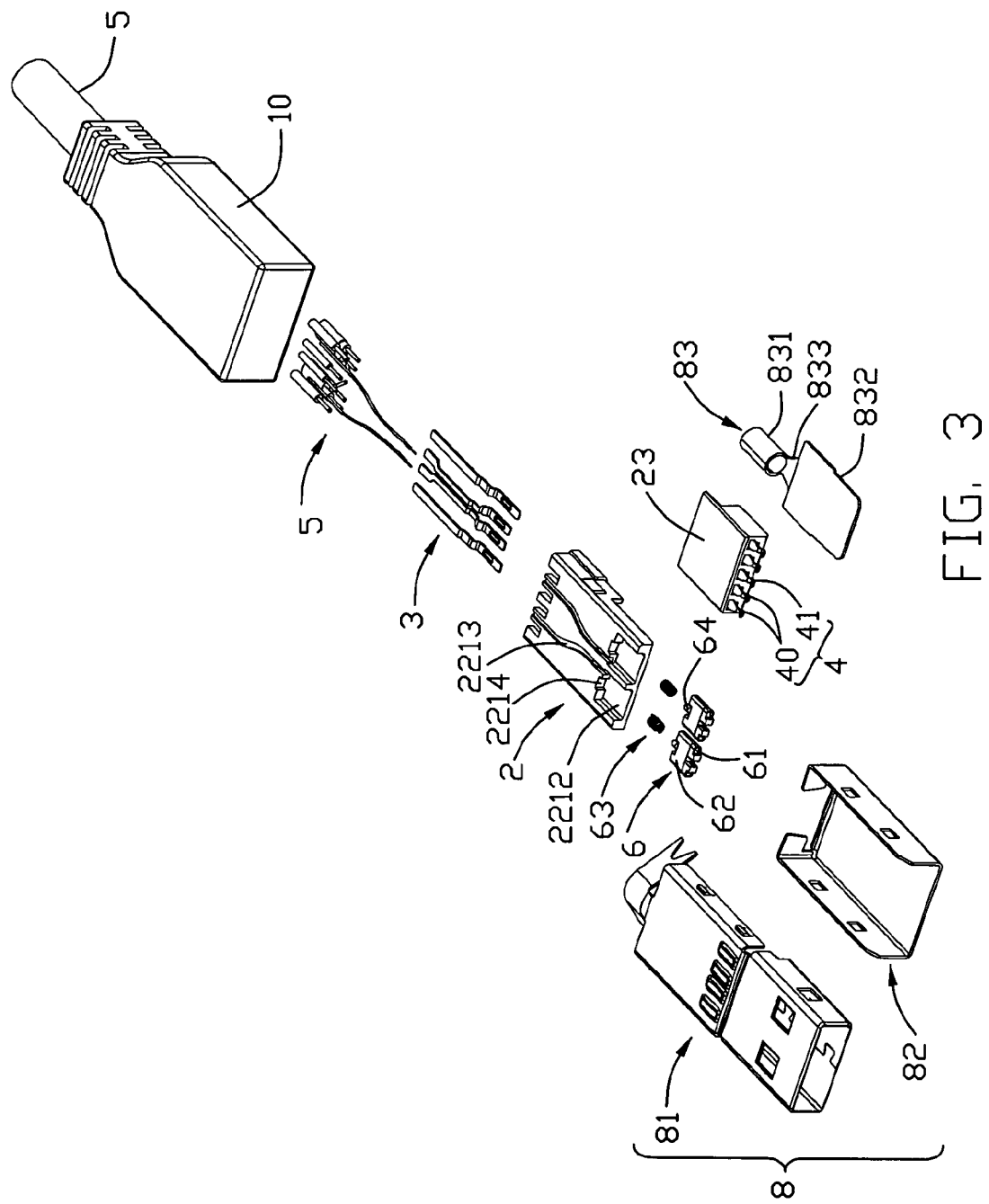
FIG. 3 is similar to FIG. 2, but viewed from another aspect.
Figure 4:
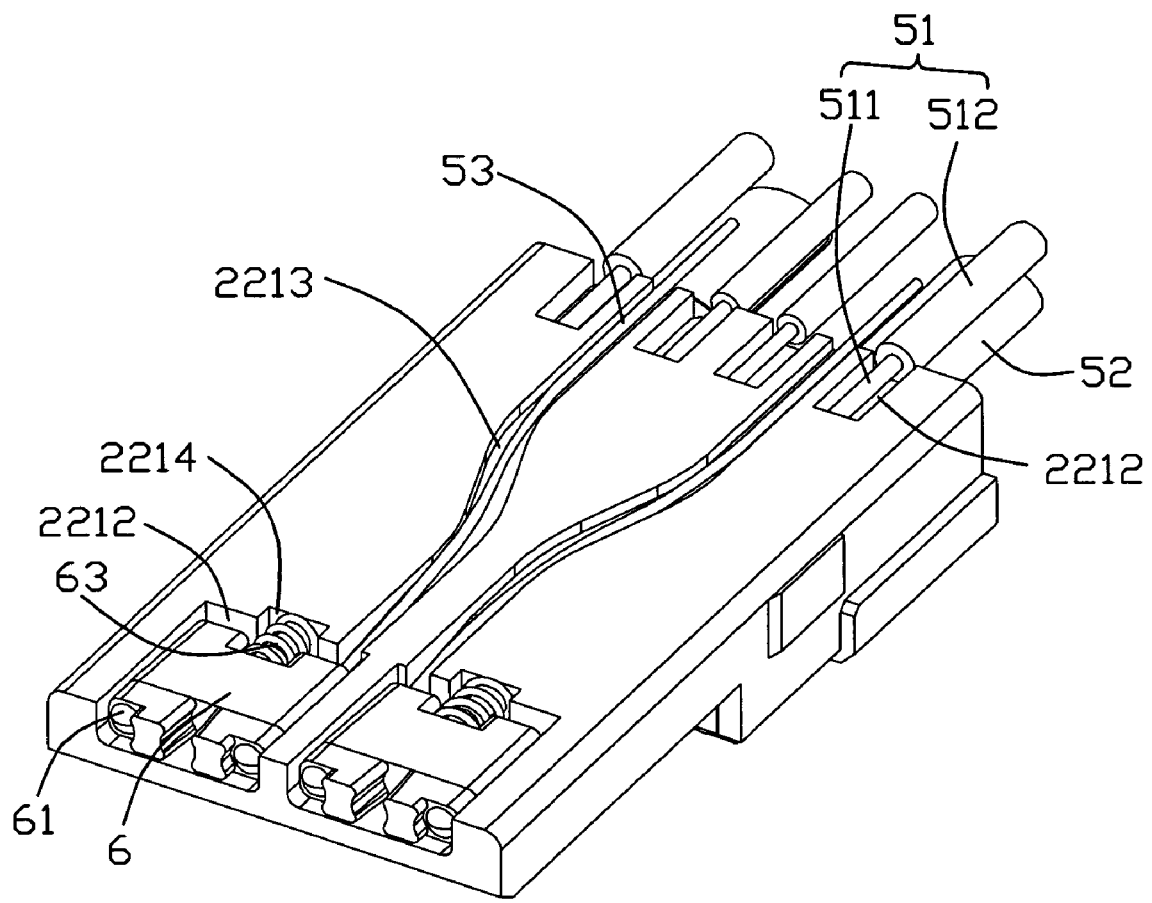
FIG. 4 is a partially assembled view of the cable assembly.
Figure 5:
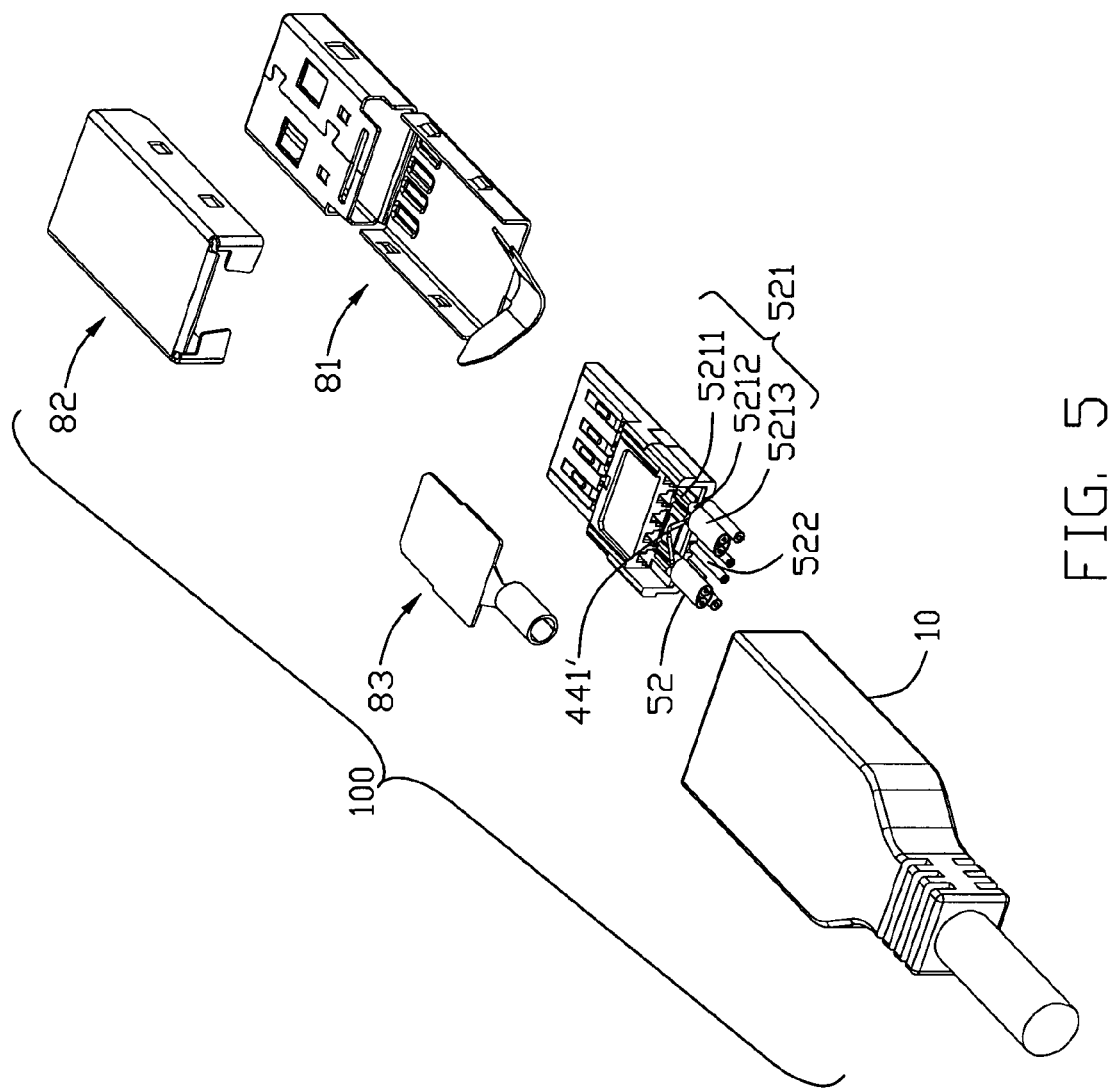
FIG. 5 is other partially assembly view of the cable assembly.
Figure 6:
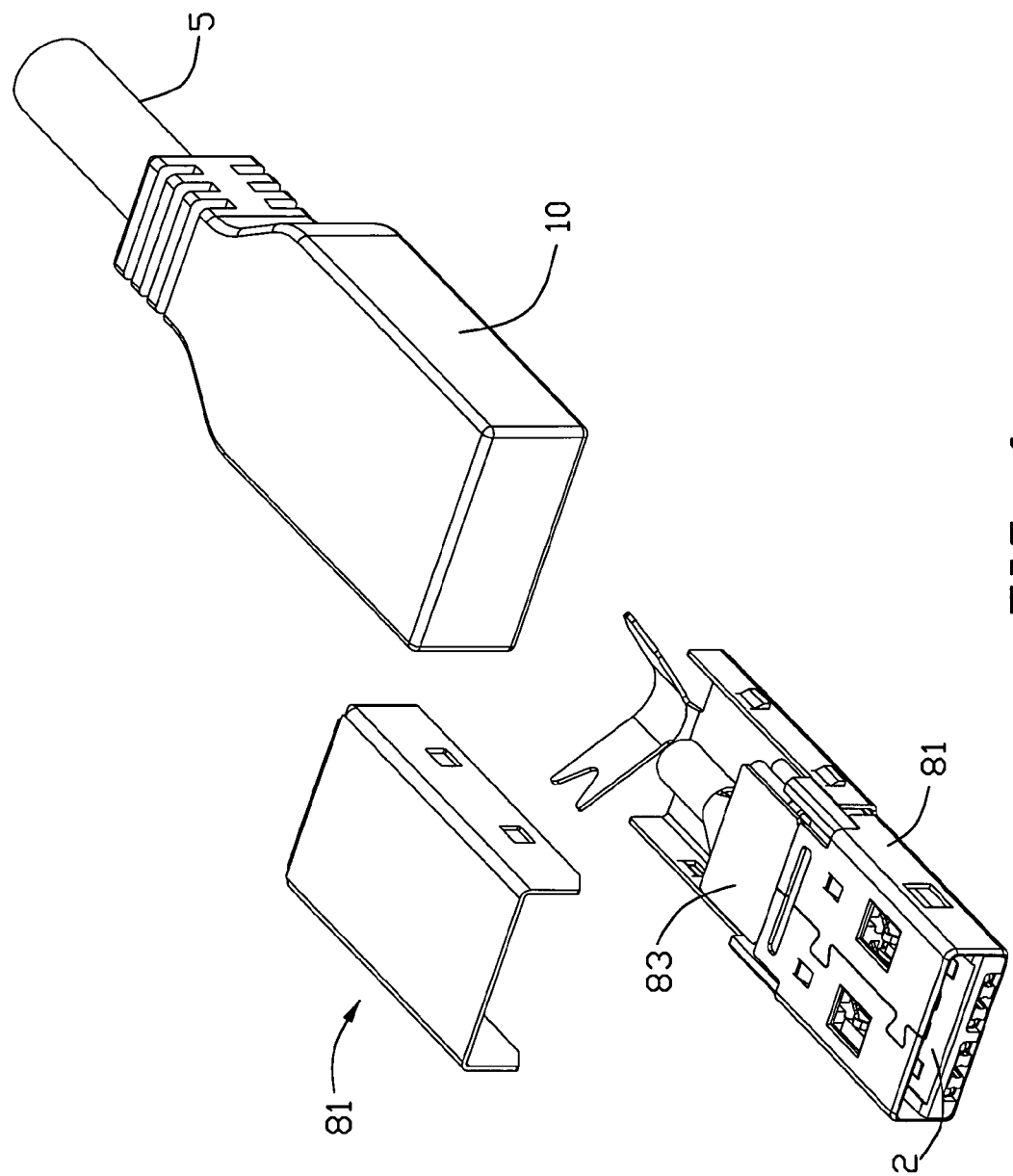
FIG. 6 is another partially assembly view of the cable assembly.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-6, a cable assembly 100 according to the first embodiment of the present invention is disclosed. The cable assembly 100 comprises an insulative housing 2, a set of first contacts 3, a set of second contacts 4 and two optical modules 6 supported by the insulative housing 2, and a cable 5 connected to the first, second contacts 3, 4 and the optical module 6. The cable assembly 1 further comprises a metal shell 8. Detail description of these elements and their relationship and other elements formed thereon will be detailed below.

The insulative housing 2 includes a base portion 21 and a tongue portion 22 extending forwardly from the base portion 21. A cavity 211 is recessed downward from an up surface (not numbered) of the base portion 21, and four grooves 2111 are defined in a bottom portion of the cavity 211 and spaced apart one another along a transversal direction. Four supplemental grooves 2211 are recessed downward from an up surface (not numbered) of the tongue portion 22 and located in front of the four grooves 2111. The supplemental grooves 2211 are shorter than the four grooves 2111. Further, the four supplemental grooves 2211 are arranged higher than the four grooves 2111 along a vertical direction. Four slots 2112 are defined in a rear section of the base portion 21 and through a bottom surface (not numbered) of the base portion 21. The four slots 2112 are located behind of the four grooves 2111 and in communication thereto. Two mounting cavities 2212 are located in a lower segment of a front part of the tongue portion 22. A poisoning slot 2214 is defined in a rear side of the mounting cavity 2212. Furthermore, a concave (not numbered) may be defined in a bottom side of the mounting cavity 2212 for inhibiting the optical module 6 moving forwardly excessively and sliding out of the mounting cavity 2212. Two curved slots 2213 are defined in a lower section of the insulative housing 2 and in communication to the two mounting cavities 2212, respectively. A distance of front parts of the two slots 2213 is narrow than rear parts thereof.

The set of first contacts 3 has four contact members arranged in a row along the transversal direction and each first contact 3 substantially includes a planar retention portion 32 accommodated in the corresponding groove 2111, a mating portion 34 raised upwardly and extending forwardly from the retention portion 32 and accommodated in the corresponding supplemental groove 2211, and a tail portion 36 extending rearward from the retention portion 32 and accommodated in the slots 2112. Two of the first contacts 3 located in a second and third positions of the first contacts row have same structure, and substantially same as those of other two first contacts 3 disposed laterally, expect for a distance between the retention portions 32 of the two of the first contacts 3 are more smaller than a distance between mating portions 34 or tail portions 36 of the two of the first contacts 3.

The set of second contacts 4 has five contact members arranged in a row along the transversal direction and combined with an insulator 23 by inserted-mold process. The set of second contacts 4 are separated into two pair of signal contacts 40 for transmitting differential signals and a grounding contact 41 disposed between the two pair of signal contacts 40. Each signal contact 4 includes a planar retention portion (not shown) received in the insulator 23, a curved mating portion 42 extending forward from the retention portion and disposed beyond a front surface of the insulator 23, and a tail portion 44 extending rearward from the retention portion and disposed behind a back surface of the insulator 23. The grounding contact 41 is similar to the signal contacts 40, except that the tail portions 44' thereof is much broader than the tail portion 44 of the signal contact 40. A V-shaped slot 441' is recessed downward from an up surface of the tail portion 44' of the grounding contact 41.

The insulator 23 is mounted to the cavity 211 of the base portion 21, with mating portions 42 of the second contacts 4 located behind the mating portions 34 of the first contacts 3 and above the up surface of the tongue portion 22, the tail portions 44, 44' of the signal contacts 40 and the grounding contact 41 disposed in a rear segment of the cavity portion 211 and higher than the tail portions 36 of the first contacts 3.

Each optical module 6 includes two lens members 61 arranged in juxtaposed manner and enclosed by a holder member 62 and retained in the corresponding mounting cavity 2212. Furthermore, a coil spring member 63 is engaged with the holder member 62, with a protrusion portion 64 of the holder member 62 extending into an interior of a front segment of the spring member 63. The optical module 6 is mounted to the mounting cavity 2212, with a rear end of the spring member 63 accommodated in the poisoning slot 2214. Therefore, the optical module 6 is capable of moving backwardly and forwardly within the mounting cavity 2212.

The cable 5 includes a set of first wires 51, a set of second wires 52, a set of third wires (optical fibers) 53 and an insulative jacket 54 enclosed outside of the first wires 51, the second wires 52 and the third wires 53.

Each first wire 51 has an inner conductor 511 and an insulative shielding portion 512 enclosing the inner conductor 511. A length of front segment of the insulative shielding portion 512 is deprived away to have the corresponding inner conductor 511 exposed outside. The inner conductor 511 is put into the slot 2112 and supported by the tail portion 36, and then soldered to the tail portion 36.

Each second wire 52 has two sub-wires 521 to form differential pairs and a grounding wire 522 enclosed within a shielding member 5213. Each sub-wire 521 has an inner conductor 5211 and an insulative shielding portion 5212 enclosing thereon. A length of front segment of the insulative shielding portion 5212 is deprived away to have the corresponding inner conductor 5211 exposed outside. The inner conductor 5211 is supported by the tail portion 44 of the signal contacts 40 and soldered thereto. The grounding wires 522 are located in the V-shaped slot 441' of the tail portion 44' of the grounding contacts 41 and soldered thereto.

The third wires (optical fibers) 53 are through the curved slots 2213 of the insulative housing 2 and coupled to optical modules 6.

The metal shell 8 comprises a first shield part 81 and a second shield part 82. The first shield part 81 includes a front tube-shaped mating frame 811, a rear U-shaped body section 812 connected to a bottom side and lateral sides of the mating frame 811, and a cable holder member 813 attached to a bottom side of the body section 812. The second shield part 82 is of inverted U-shaped and assembled to the body portion 812 along a vertical direction. The cable holder member 813 is crimped to the insulative jacket 54 the cable 5. A connection member 83 includes a sleeve-shaped first engaging portion 831 and a planar second engaging portion 832 connected to the first engaging portion 831 via an inclined neck portion 833. The first engaging portion 831 is disposed in a top side of the mating frame 811 and attached thereto via soldering process or mechanical method. The second engaging portion 831 is used for gripping strength members (not shown) inside the cable 5. The strength members may be kevlar members, fiberglass members, and the like. The connection member 83 is shield by the second shield part 82.

The cable assembly 100 further comprises an insulative cover 10 enclosing the metal shell 8 and partial of insulative jacket 54 of the cable 5.

Figure 7:
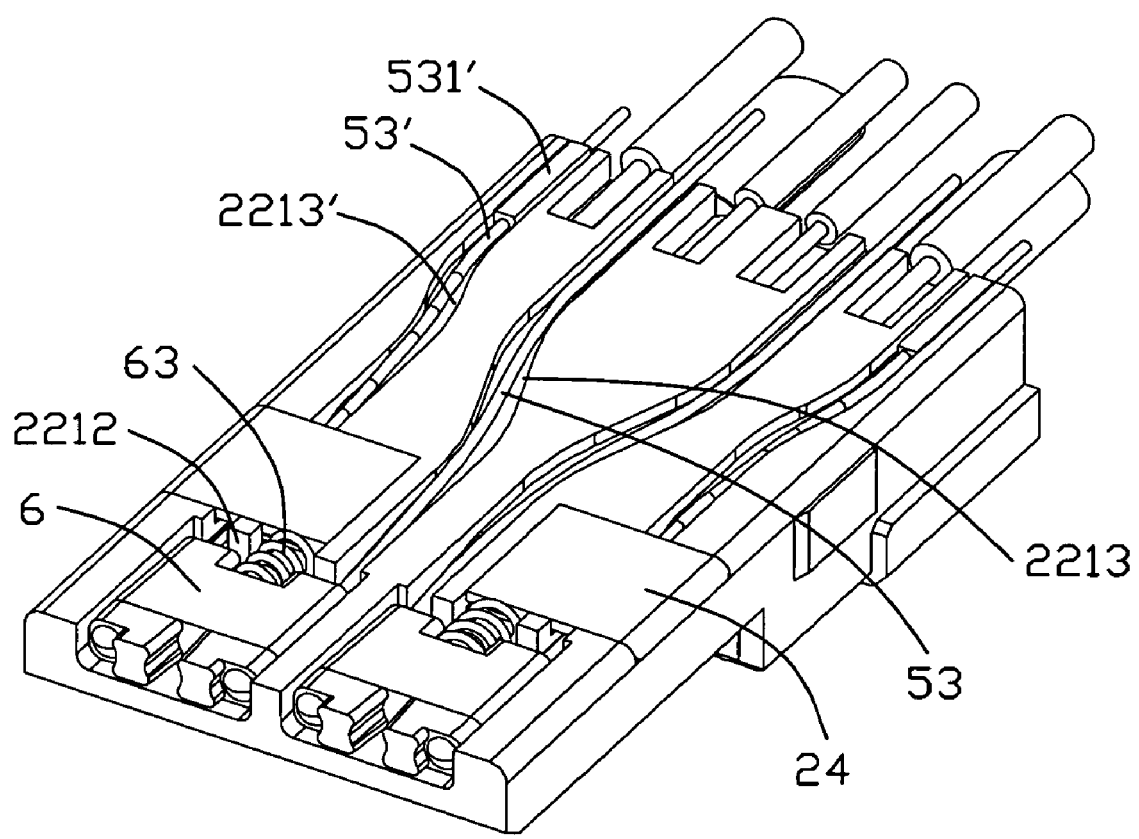
FIG. 7 is a partially assembled view of the cable assembly in accordance with the second embodiment of the present invention.

Referring to FIG. 7 in conjunction with FIGS. 1-6, a cable assembly according to the second embodiment of the present invention is disclosed. Compared with the cable assembly 100 of the first embodiment, the differences therebetween are as follows: two additional curved slots 2213' are defined in lateral sides of the lower section of the insulative housing 2 and in communication to the two mounting cavities 2212, and two additional optical fibers 53' are provided and extend into the two additional curved slots 2213' for connecting to the optical modules 6, respectively. Two cap members 24 are arranged behind the mounting cavities 2212 and shield the two additional optical fibers 53'. Two attachment members 531' are combined with the two optical fibers 53' and inserted into rear sections of the additional curved slots 2213', respectively. Description of other identical elements members and structures is omitted hereby.

The two optical modules (terminations) 6 have floatable function relative to the insulative housing 2, furthermore, the two optical modules 6 are capable of movement with respect to one another. Thus, the optical modules 6 can manufactured easily and mating with terminations of complementary reliably.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

We claim:

1. A cable assembly, comprising:
   an insulative housing having a base portion and a tongue portion extending forwardly from the base portion, said tongue portion defining a top side and a bottom side opposite to the top side, at least a mounting cavity and a slot defined in a bottom side of the insulated housing, said slot located behind and communicated to the mounting cavity;
   a plurality of contacts supported by the base portion, each contact having a mating portion arranged proximate to the top side of the tongue portion, and a tail portion supported by the base portion;
   an optical module accommodated in the mounting cavity and an elastic member arranged between the optical module and a back side of the mounting cavity;
   an optical fiber extending through the slot and connected to the optical module; and
   a metal shell having a mating frame enclosing the tongue portion and the optical module therein;
   wherein the optical module is mechanically linked to the insulative housing via the elastic member;
   wherein the optical module includes two lens members and a holder member enclosing the lens members.

2. The cable assembly as claimed in claim 1, wherein a protrusion portion formed on a back side of the holder member and extending into an interior of a front segment of the elastic member.

3. The cable assembly as claimed in claim 2, wherein a positioning slot is defined in a rear side of the mounting cavity, and a rear segment of the elastic member is received in the positioning slot.

4. The cable assembly as claimed in claim 3, wherein the contacts are divided into a set of first contacts and a set of second contacts, and the first contacts and the second contacts are capable of transmitting different signals.

5. The cable assembly as claimed in claim 4, wherein the mating portions of the first contacts are spaced apart the mating portions of the second contacts along a front-to-back direction.

6. The cable assembly as claimed in claim 5, wherein the mating portions of the first contacts are disposed adjacent to the top side of the tongue portion, and the mating portions of the second contacts are located above the top side of the tongue portion.

7. The cable assembly as claimed in claim 4, wherein the tail portions of the first contacts are vertically spaced apart the tail portions of the second contacts.

8. The cable assembly as claimed in claim 1, wherein there are two slots and two mounting cavities defined in the bottom side of the insulated housing; and the two slots are communicated to the two mounting cavities, respectively.

9. The cable assembly as claimed in claim 8, wherein a distance between the slots is divergent along a front-to-back direction.

10. The cable assembly as claimed in claim 9, wherein two optical fibers extend through the slots and are coupled to two optical modules accommodated in the two mounting cavities.

11. The cable assembly as claimed in claim 10, wherein two additional slots are defined in later sides of the low section of the insulated housing and communicated to the mounting cavities, respectively.

12. The cable assembly as claimed in claim 11, wherein two additional optical fibers extend through the additional slots and are respectively coupled to the two optical modules.

13. The cable assembly as claimed in claim 12, wherein two cap members are arranged behind the mounting cavities and shield the two additional optical fibers.

14. The cable assembly as claimed in claim 12, wherein two attachment members are combined with the two optical fibers and inserted into rear sections of the additional slots.

15. The cable assembly as claimed in claim 1, wherein the elastic member is a spring member.

16. The cable assembly as claimed in claim 1, wherein the slot has a curved shape.

17. A cable assembly, comprising:
- an insulative housing having a base portion and a tongue portion extending forwardly from the base portion, said tongue portion defining a top side and a bottom side opposite to the top side, at least one mounting cavity and one slot defined in a bottom side of the insulated housing, said slot located behind and communicated to the mounting cavity;
- a plurality of contacts supported by the base portion, each contact having a mating portion arranged proximate to the top side of the tongue portion, and a tail portion supported by the base portion;
- an optical module accommodated in the mounting cavity and equipped with an elastic member, the optical module including two lens members and a holder member enclosing the lens members;
- at least one optical fiber extending through the slot and connected to the optical module; and
- a metal shell having a mating frame enclosing the tongue portion and the optical module therein.

18. The cable assembly as claimed in claim 17, wherein there are two optical fibers connected to the optical module, and the elastic member is disposed between the two optical fibers.

19. The cable assembly as claimed in claim 18, wherein the elastic member is a spring member.

20. A cable assembly, comprising:
- an insulative housing having a base portion and a tongue portion extending forwardly from the base portion, said tongue portion defining a top side and a bottom side opposite to the top side, at least one mounting cavity and one slot defined in a bottom side of the insulated housing, said slot located behind and communicated to the mounting cavity;
- a plurality of contacts supported by the base portion, each contact having a mating portion arranged proximate to the top side of the tongue portion, and a tail portion behind the mating portion in a front-to-back direction;
- a plurality of wires mechanically and electrically connected to the tail portions of the corresponding contacts, respectively;
- an optical module accommodated in the mounting cavity and equipped with an elastic member, the optical module including two lens members and a holder member enclosing the lens members;
- at least one optical fiber extending through the slot and connected to the optical module; and
- a metal shell having a mating frame enclosing the tongue portion and the optical module therein; wherein
- said at least one optical fiber is located between two corresponding wires in a transverse direction perpendicular to said front-to-back direction.

* * * * *